(12) United States Patent
Suzuki et al.

(10) Patent No.: US 6,273,466 B1
(45) Date of Patent: Aug. 14, 2001

(54) IMPACT ENERGY ABSORPTION STRUCTURE FOR A VEHICLE TRANSMISSION SHIFTING DEVICE

(75) Inventors: Hiroyoshi Suzuki; Kazutaka Maehara; Yoshinori Furusawa; Kunihiro Koike; Yuji Yoshida, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/444,580

(22) Filed: Nov. 19, 1999

(30) Foreign Application Priority Data

Nov. 20, 1998 (JP) .................................................. 10-331175
Nov. 27, 1998 (JP) .................................................. 10-336726

(51) Int. Cl.⁷ .................................................. B60R 21/04
(52) U.S. Cl. .......................................... 280/748; 296/35.2
(58) Field of Search ..................................... 280/748, 751; 180/333; 188/371, 376; 296/35.2

(56) References Cited

U.S. PATENT DOCUMENTS 3,750,492 * 8/1973 Holmes, Jr. ............................ 74/523
4,055,230 * 10/1977 Kestian et al. ....................... 180/89.1
4,077,275 * 3/1978 Kluge et al. ......................... 74/473 R
6,082,216 * 7/2000 Watanabe et al. ................... 74/473.3

FOREIGN PATENT DOCUMENTS 44 04 569 * 9/1994 (DE) .
5-246262    9/1993 (JP) .
9-58288  * 3/1997 (JP) .
10-16597    1/1998 (JP) .

* cited by examiner

Primary Examiner—Paul N. Dickson
(74) Attorney, Agent, or Firm—Sughrue, Mion, Zinn, Macpeak & Seas, PLLC

(57) ABSTRACT

A speed change shift device 5 comprises a device main body 7 and a shift lever 9 protruding from the device main body 7. An impact energy absorption structure for the device 5 is constructed such that the device main body 7 is fixed to vehicle body side brackets 4 via the impact energy absorption body A. The impact energy absorption body A is broken by an impact energy F applied to the device 5, whereby the device 5 is allowed to move in an impact energy applied direction.

11 Claims, 16 Drawing Sheets

IMPACT ENERGY ABSORPTION STRUCTURE FOR A VEHICLE TRANSMISSION SHIFTING DEVICE

BACKGROUND OF THE INVENTION

The present invention relates to an impact energy absorption structure for a shifting device of vehicular transmission, and more particularly to an impact energy absorption structure for a shifting device of a vehicular transmission which comprises a main body and a shift lever protruding from the main body.

Conventionally known as an impact energy absorption structure of this type is an impact energy absorption structure constructed such that a main body is swingably provided on a vehicle body frame in such a manner as to be constrained with a constraining member against rocking thereof, whereby when an impact energy is applied to a shifting device of the vehicular transmission, the constraint with the constraining member is released so that the device main body is allowed to rock (Japanese Unexamined Patent Publication No. Hei. 10-16597).

However, if the impact absorption structure is constructed using a rock constraining system as seen in the prior art, there is caused a problem in which the construction of such a structure gets complicated to thereby increase its production costs. This is a first problem of the prior art.

In addition to this, conventionally known as an impact energy absorption structure of this type is an impact energy absorption structure in which a manipulating knob of a shift lever is formed of an elastic material and in which a part of a rod-like lever main body of the shift lever which resides in the manipulating knob is bent to the left of the driver, a notch being formed in the bent portion (Japanese Unexamined Patent Publication No. Hei. 5-246262).

In the conventional impact energy absorption structure, however, since a distal end portion of the shift lever is constructed so as to be bent by virtue of an impact energy from the driver, there is a drawback in which an impact energy absorption stroke is short, a low impact energy absorption performance being thereby provided. This is a second problem of the prior art.

SUMMARY OF THE INVENTION

An object of the present invention is to provide an impact energy absorption structure that is simple in construction and low in cost.

The object above can be achieved by an impact energy absorption structure for a shifting device of a vehicular transmission, the structure, according to the present invention, comprising:

a main body;

a shift lever protruding from the main body;

an impact absorption member, through which the main body is fixed to a vehicle body, adapted to be broken by an impact force more than a predetermined force applied to the shifting device, to thereby allow the shifting device to move in an impact force applied direction.

In addition, the object above can also be achieved by an impact energy absorption structure for a shifting device of a vehicular transmission which comprises a main body and a shift lever protruding from the main body, wherein the main body is fixed to a vehicle body via an impact absorption body adapted to be broken by an impact energy applied to the shifting device, whereby the shifting device is allowed to move in an impact energy applied direction.

Thus, if the main body is constructed using a fixing system as described above, it is possible to make the construction simpler and the cost lower than as with the rock conventional constraining system.

Further, it is also an object of the present invention to provide an impact energy absorption structure having a high impact energy absorption performance.

The object above can be achieved by an impact energy absorption structure for a shifting device of a vehicular transmission, the structure, according to the present invention, comprising:

a main body;

a shift lever protruding from the main body;

an impact absorption member, through which the main body is fixed to a vehicle body, adapted to be broken by an impact force more than a predetermined force applied to the shifting device, to thereby allow the shifting device to move in an impact force applied direction, wherein the main body comprises a shift gate from which the shift lever protrudes, and the shift lever is provided with a rod-like lever main body which is disposed on the main body in such a manner that an axis of said rod-like lever main body intersects with the impact force applied direction.

Furthermore, the object above can also be achieved by an impact energy absorption structure for a shifting device of vehicular transmission, according to the present invention, comprising a main body and a shift lever protruding from a shifting gate of the main body, wherein a rod-like lever main body of the shift lever is disposed on the main body such that an axis of the rod-like lever main body intersects with an impact energy applied direction in order that the rod-like lever main body is bent by an edge portion of the shift gate by virtue of an impact energy applied to the shift lever.

In the aforesaid construction, when an impact energy equal to or larger than a predetermined value is applied, for instance, by the head of the driver to a distal end portion, i.e., the manipulating knob of the rod-like lever main body of the shift lever, the rod-like lever main body is bent at an edge portion of the shift gate as a fulcrum, whereby the impact energy is absorbed. In this case, since the rod-like lever main body is bent at an intermediate portion thereof, there is provided a relatively long impact energy absorption stroke.

DETAILED DESCRIPTION OF THE PREFERRED EMBODIMENTS

In a description of a mode of operation of the present invention, "front," "rear," "left," and "right" indicate directions based on an understanding that the "front" represents a direction in which a vehicle advances.

Figure 1:
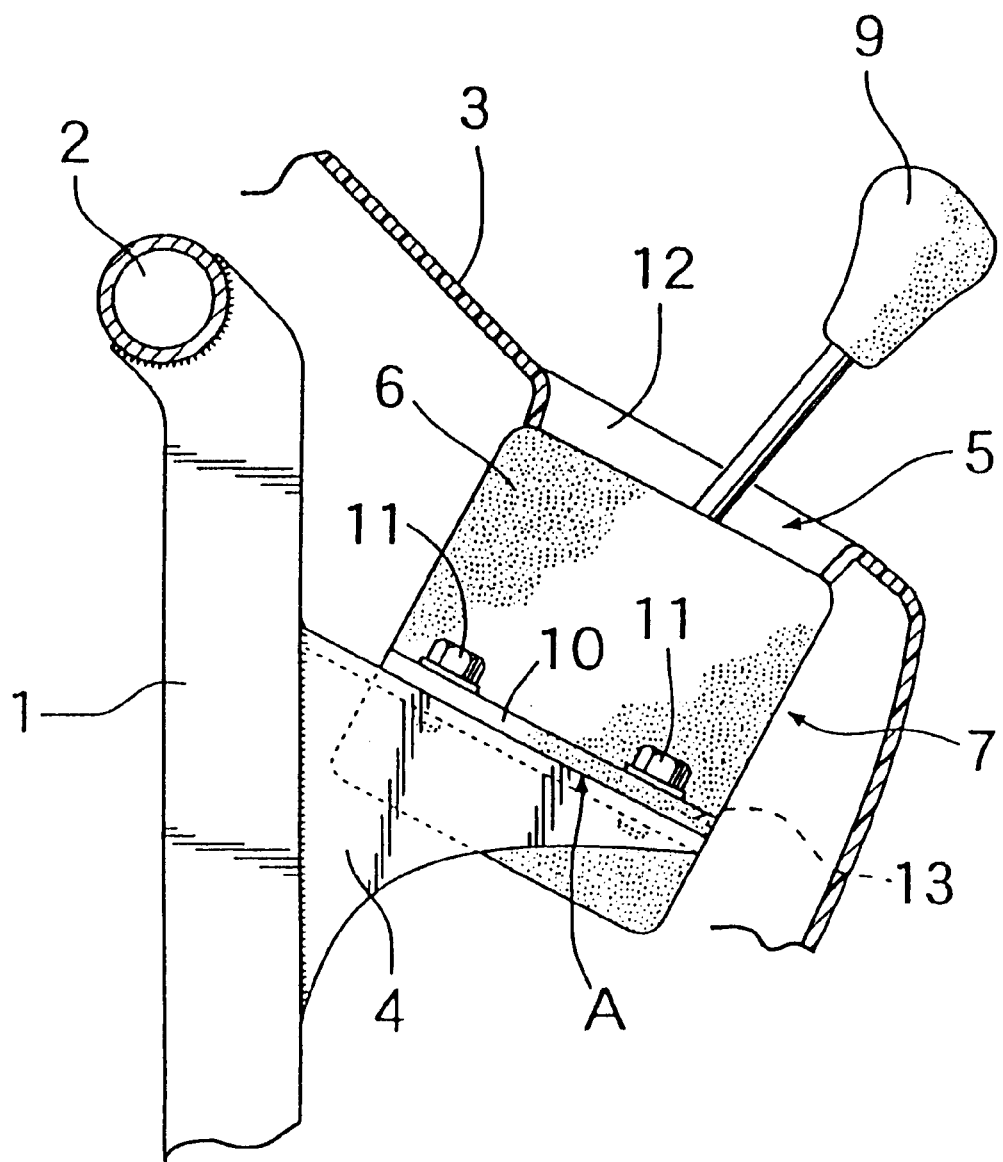
FIG. 1 shows a side view of a first example.
Figure 2:
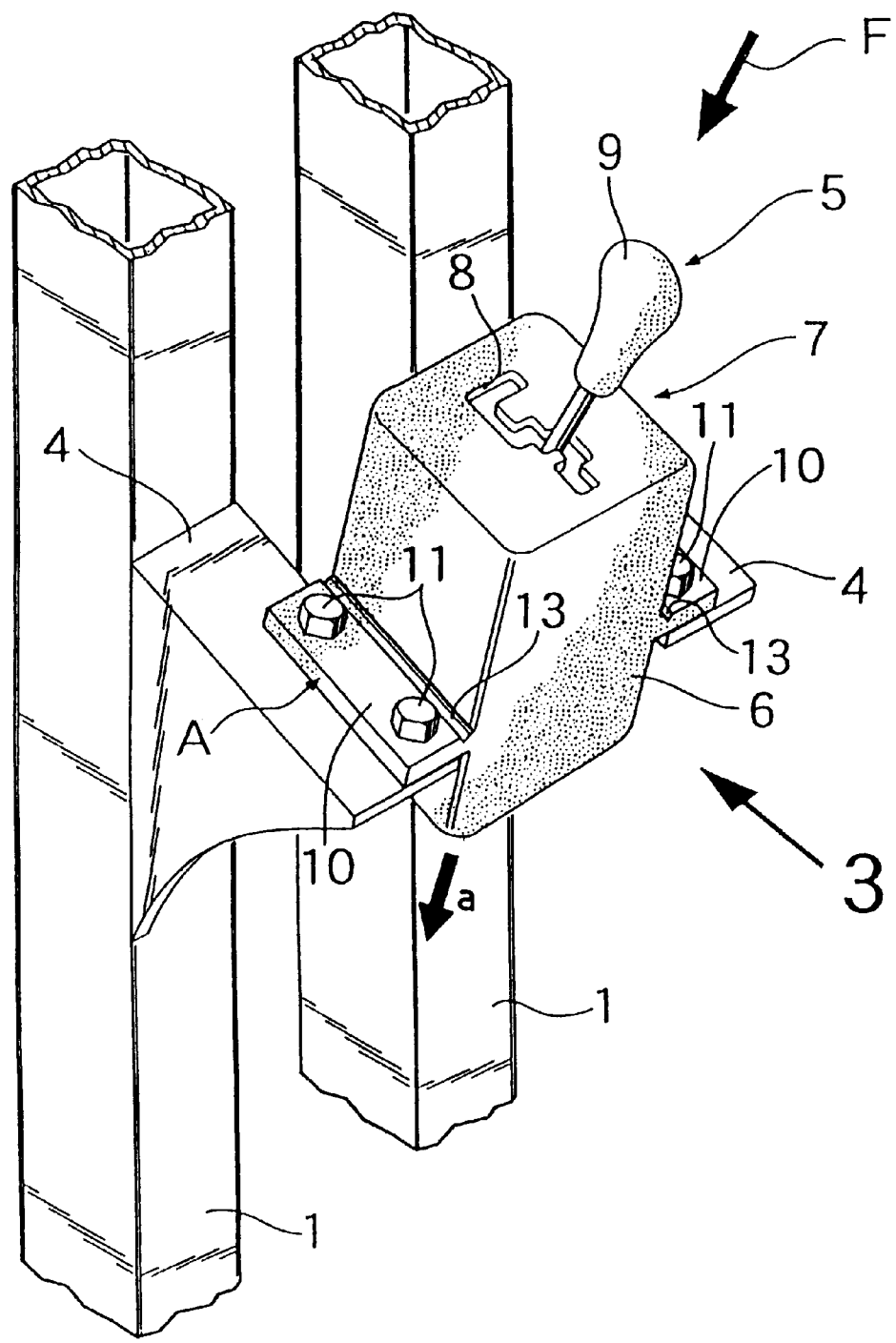
FIG. 2 shows a perspective view of the first example.
Figure 3:
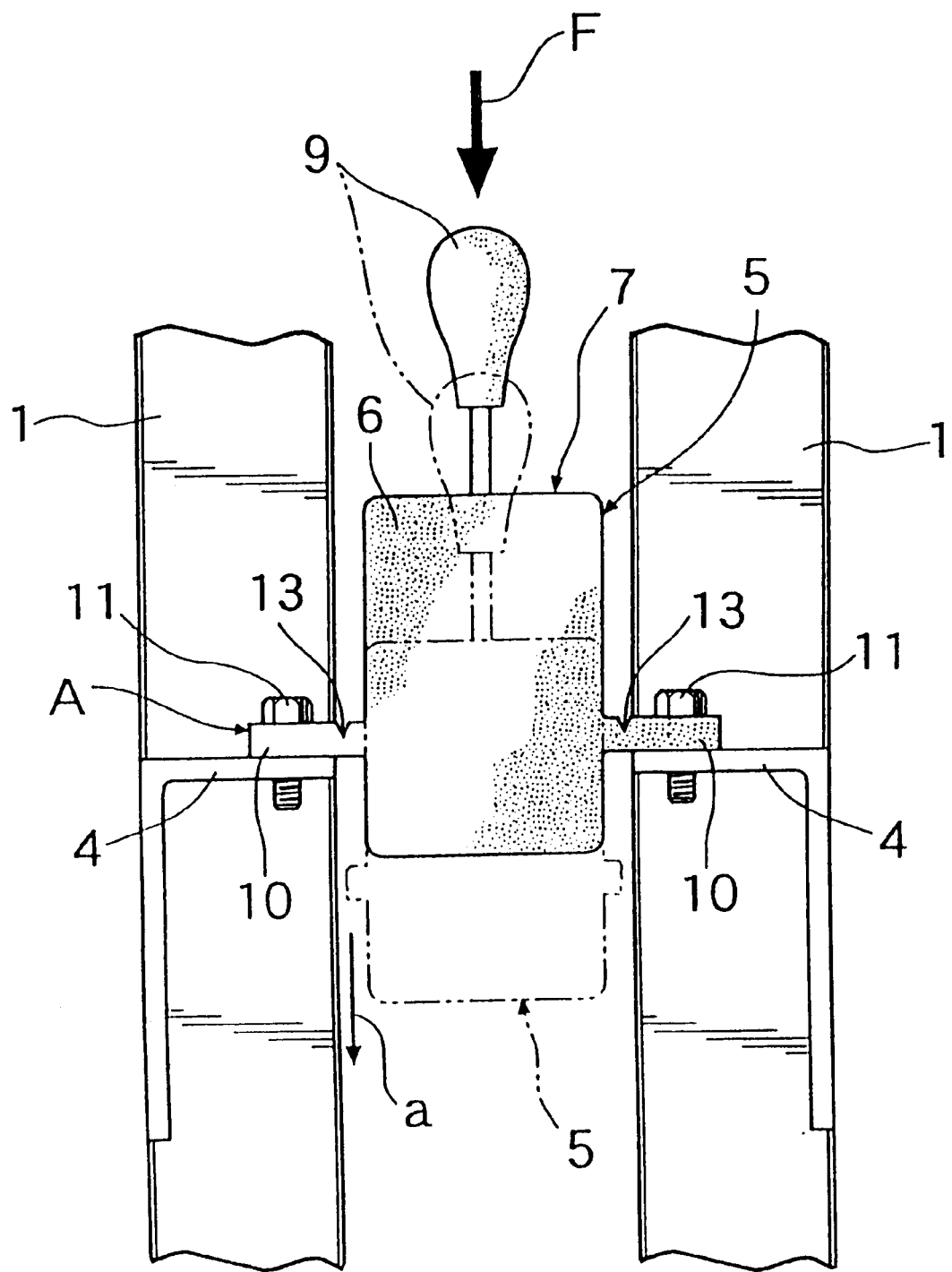
FIG. 3 shows an illustration as viewed in a direction indicated by an arrow 3 in FIG. 2.

FIGS. 1 to 3 illustrate a first example. A vehicle body, for example, of a passenger car, has a pair of left and right steel center frames 1 provided on a floor of the vehicle body in such a manner as to erect therefrom, and the respective center frames 1 are connected to each other at upper end portions thereof with a steel cross member 2. These center frames 1 and cross member 2 are concealed by an instrument panel 3.

Both the center frames 1 have a vehicle body side bracket 4 on a back thereof, and a shift device 5 is supported between those vehicle body side brackets 4. This device 5 comprises a device main body 7 and a shift lever 9 protruding from the device main body 7. The device main body 7 comprises a manipulating force transmission member connected to the shift lever 9 and accommodated in a synthetic resin box 6, and the shift lever 9 protrudes from a shift gate 8 residing in an upper wall of the box 6. A bracket 10 is integrally provided on left and right sides of the box 6, and these device side brackets 10 are placed on two vehicle body side brackets 4, respectively, and are fixedly secured to the vehicle body side brackets 4 with a plurality of bolts 11. This positions the shift gate 8 of the box within an opening 12 in the instrument panel 3, and the shift lever 9 protrudes into the passenger compartment from the opening 12. A notched groove 13 is formed in a proximal upper surface of the respective device side brackets 10 longitudinally along the full length thereof. The device side brackets 10 and those two notched grooves 13 are formed simultaneously with the formation of the box 6.

Both the device side brackets 10 each having the notched groove 13 constitute an impact energy absorption body A, and therefore the device main body 7 is fixed to the vehicle body via this impact energy absorption body A. In this state, when an impact energy F equal to or greater than a predetermined value is applied to the shift lever 9 from above, the impact energy absorption body A and hence both the device side brackets 10 are broken at the notched grooves 13, the device 5 is allowed move in a direction (a) in which the impact energy is applied to a position indicated by two-dot chain lines in FIG. 3. Thus, the impact energy F is absorbed.

In the first example, both the vehicle body side brackets 4 may be formed of a steel sheet or synthetic resin, while both the device side brackets 10 may be formed of a synthetic resin or steel having the notched groove 13.

Figure 4:
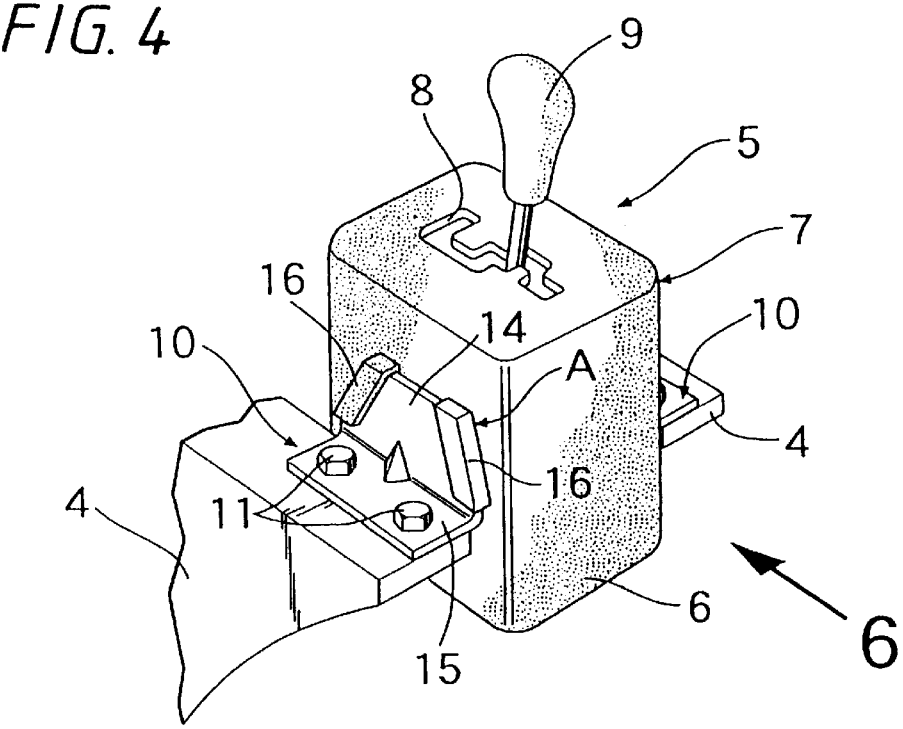
FIG. 4 shows a perspective view of a second example.
Figure 5:
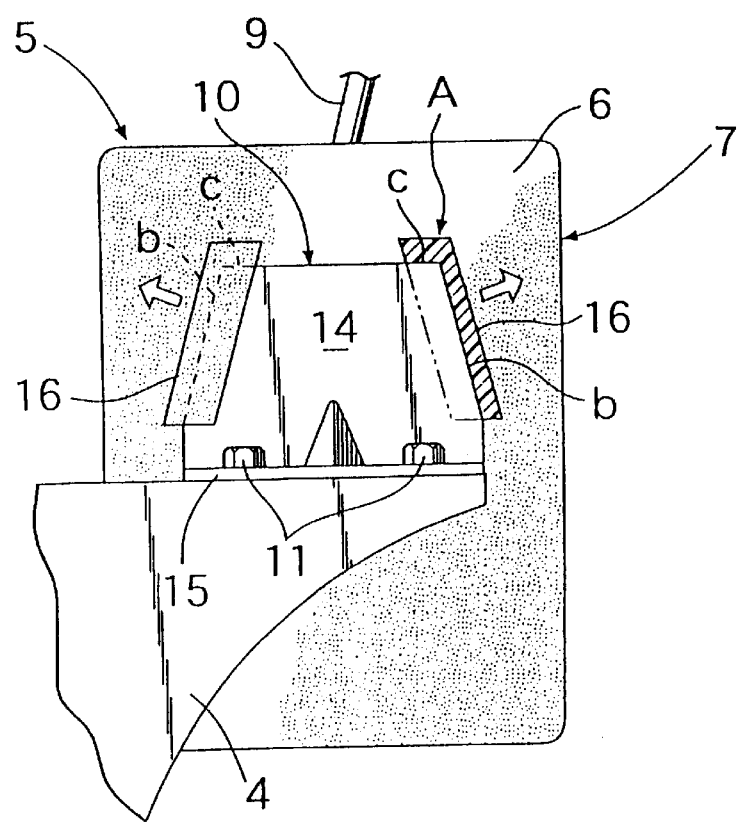
FIG. 5 shows a side view of the second example.
Figure 6:
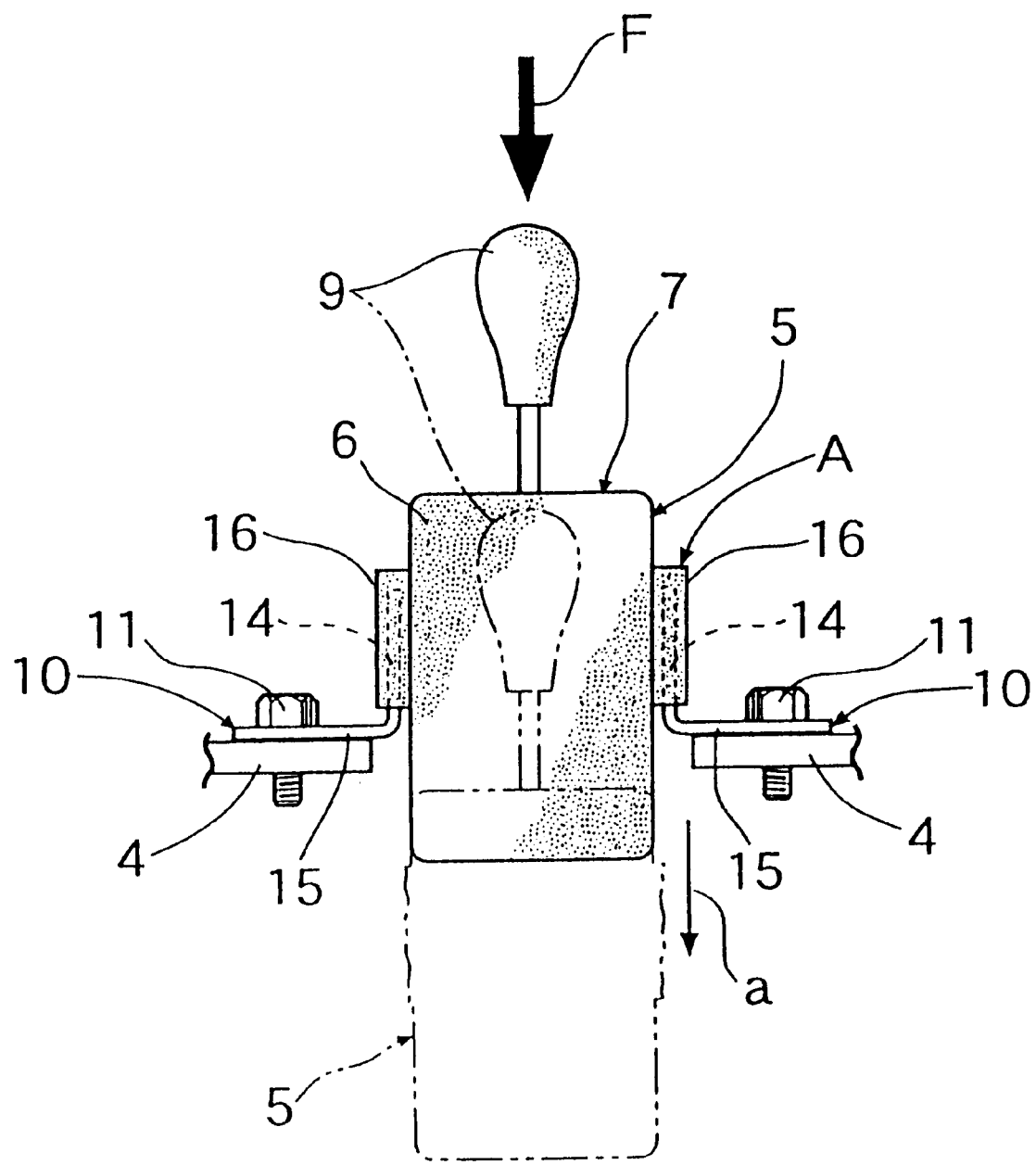
FIG. 6 shows an illustration as viewed in a direction indicated by an arrow 6 in FIG. 4.
Figure 7:
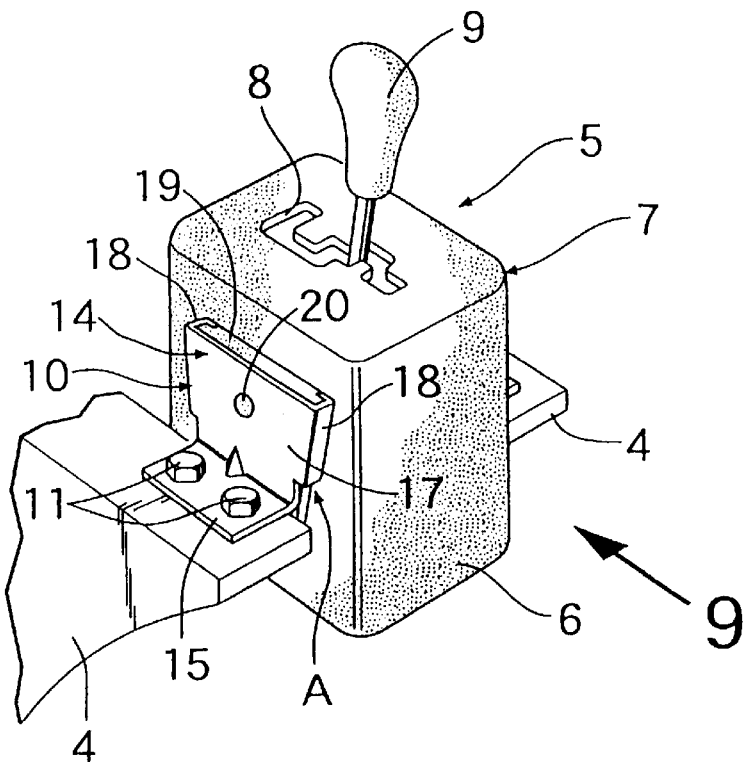
FIG. 7 shows a perspective view of a third example.
Figure 8:
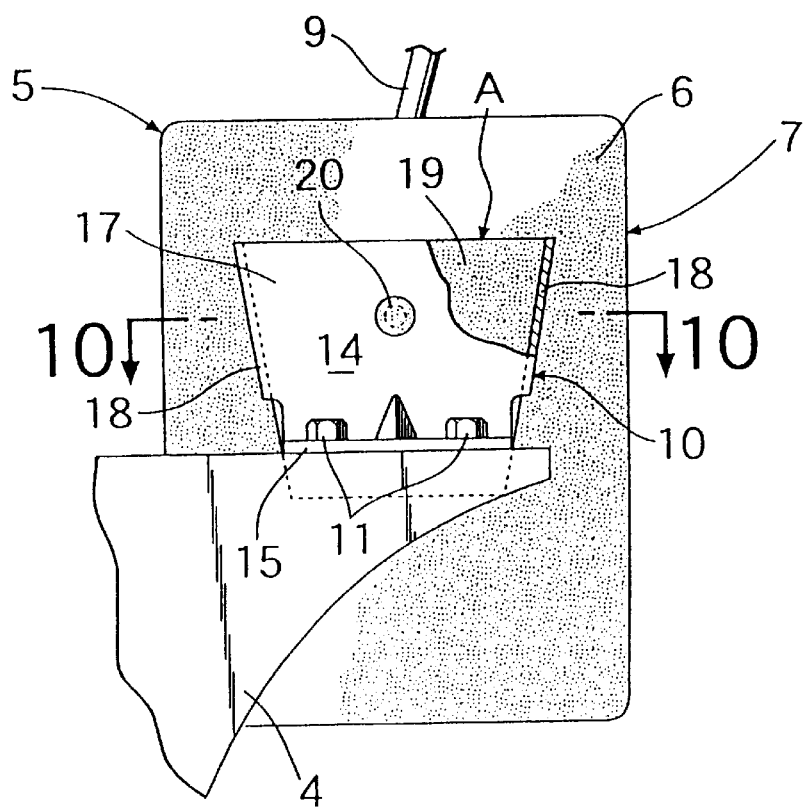
FIG. 8 shows a side view of a third example.
Figure 9:
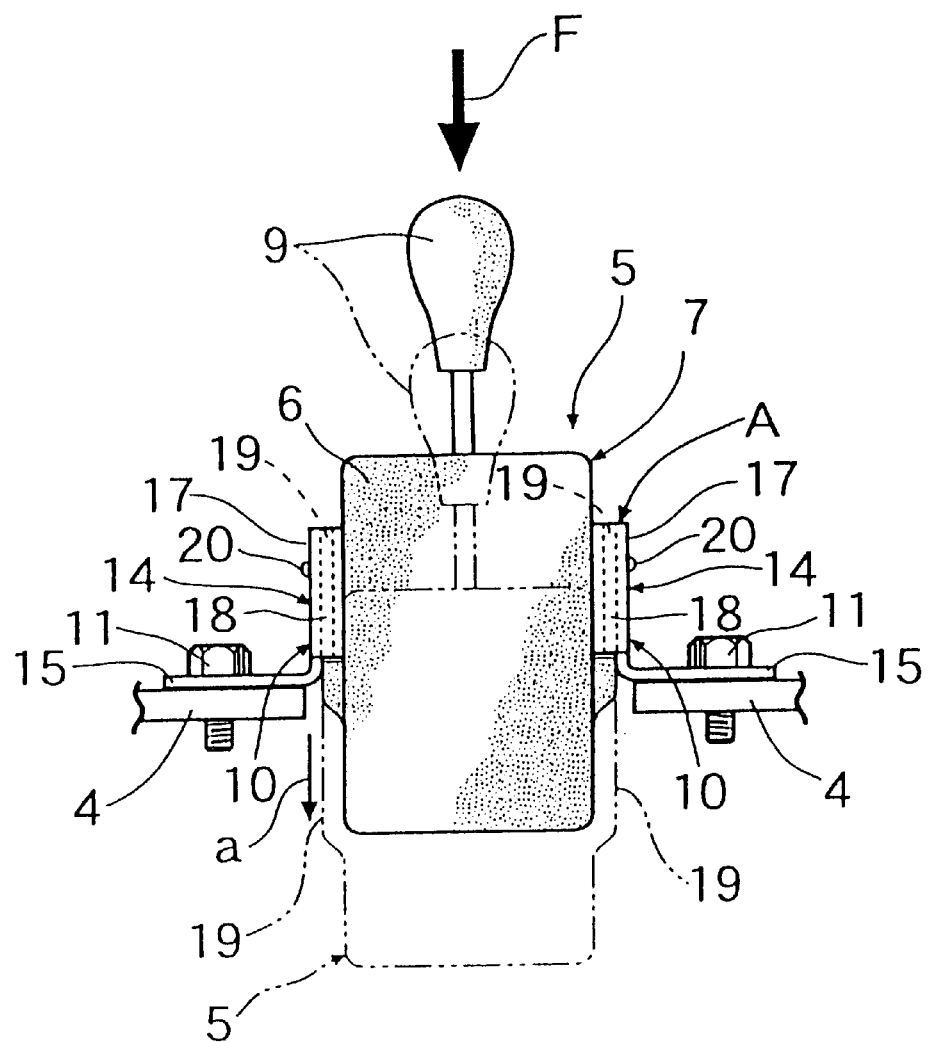
FIG. 9 shows an illustration as viewed in a direction indicated by an arrow 9.
Figure 10:
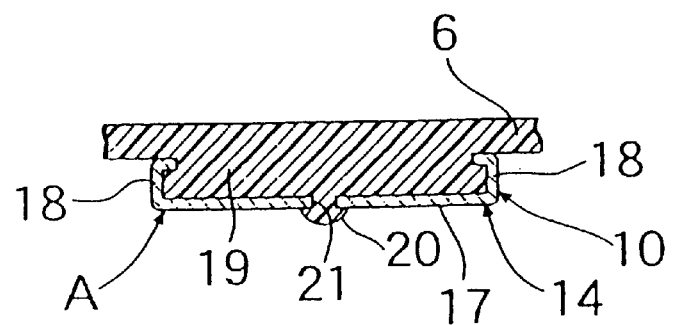
FIG. 10 shows a sectional view taken along the line 10—10 of FIG. 8.
Figure 11:
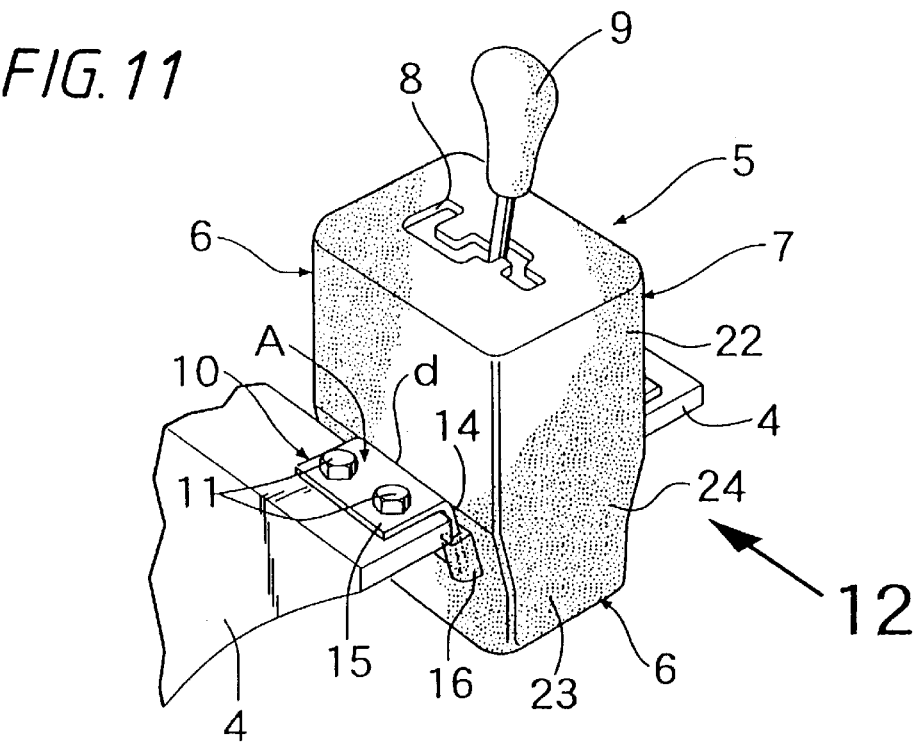
FIG. 11 shows a perspective view of a fourth example.
Figure 12:
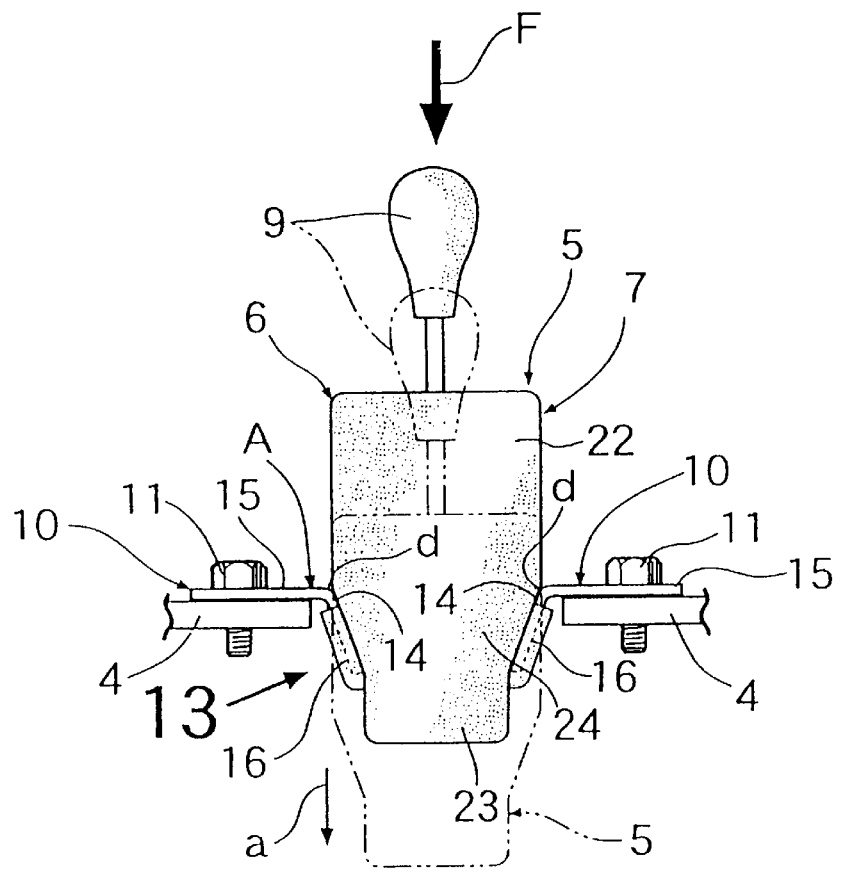
FIG. 12 shows an illustration as viewed in a direction indicated by an arrow 12 in FIG. 11.
Figure 13:
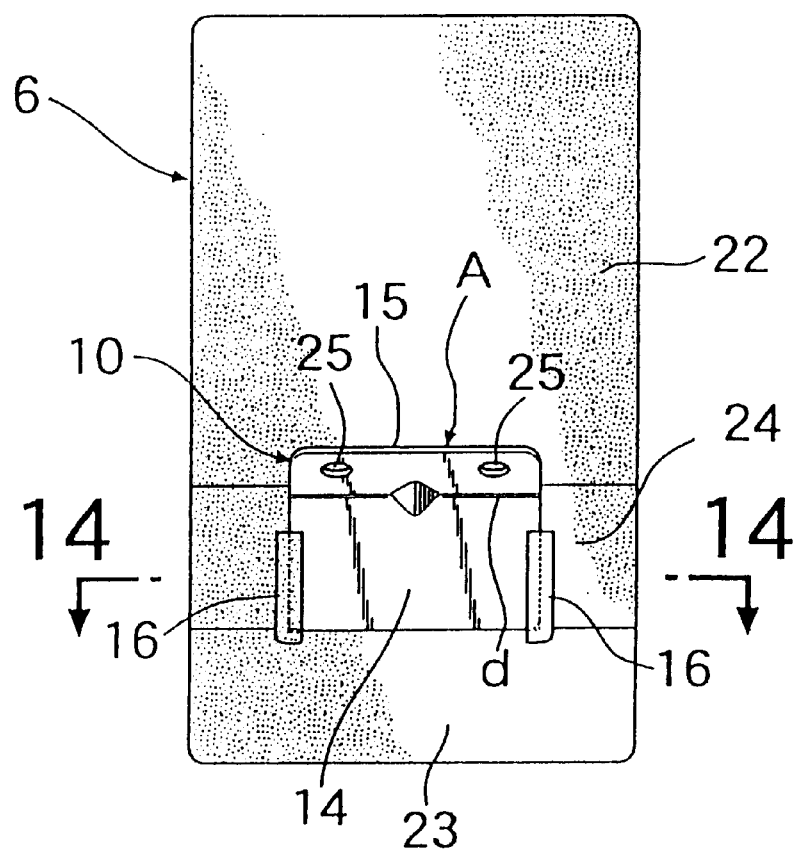
FIG. 13 shows an illustration as viewed in a direction indicated by an arrow 13 in FIG. 12.
Figure 14:
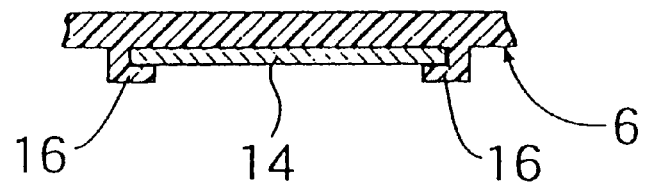
FIG. 14 shows a sectional view taken along the line 14—14 of FIG. 13.
Figure 15:
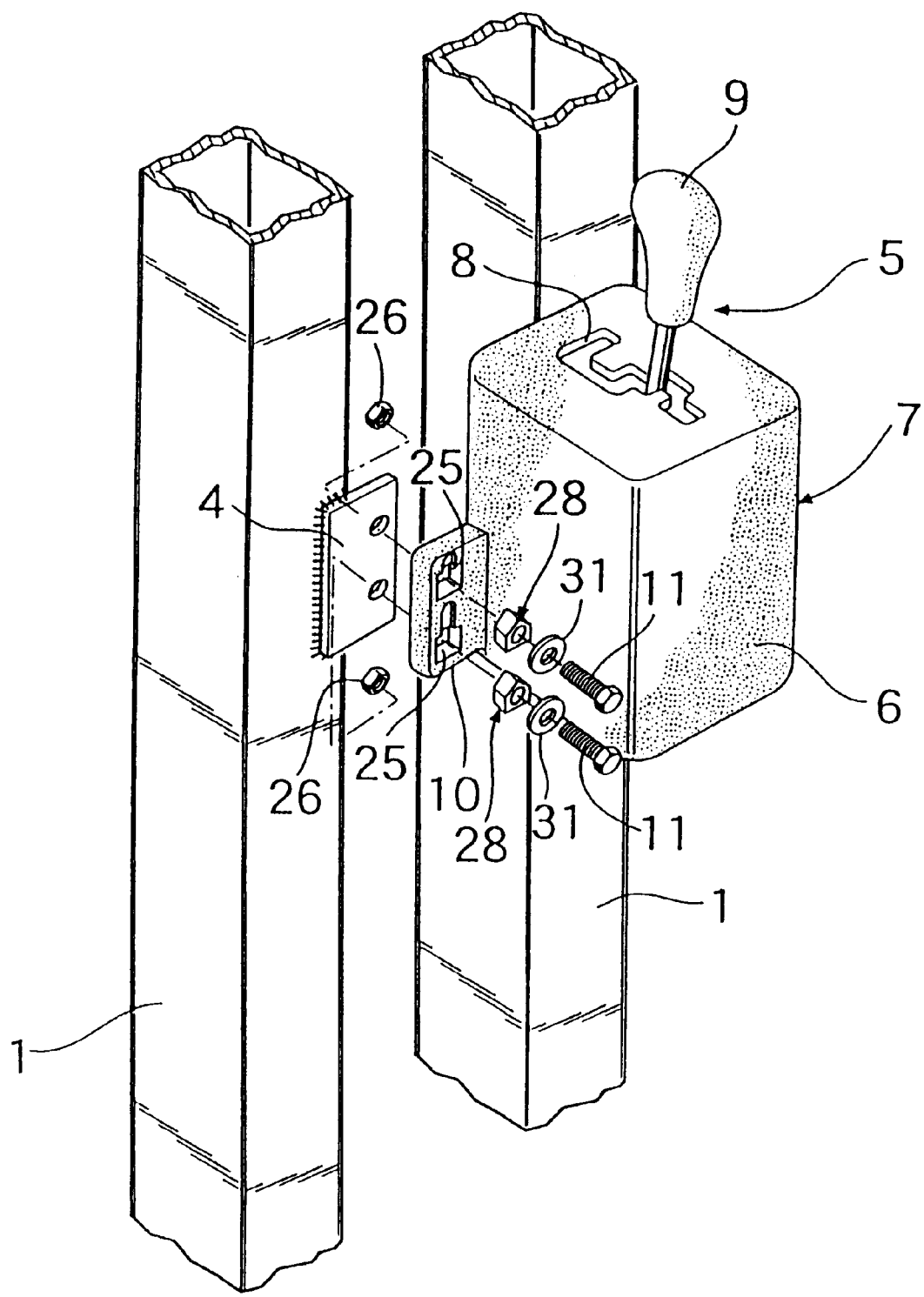
FIG. 15 shows a perspective view of a fifth example.
Figure 16:
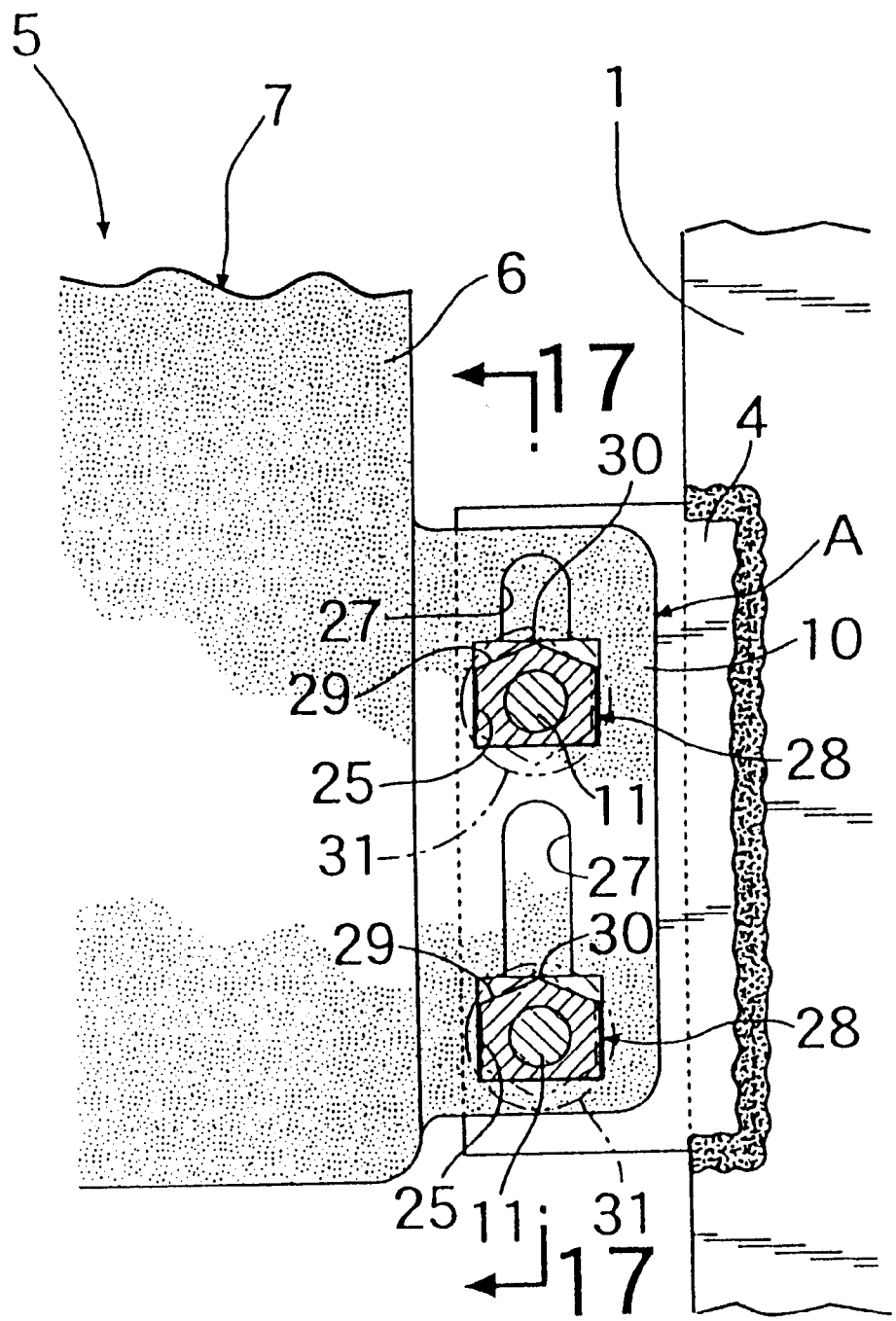
FIG. 16 shows a partially cut-away rear view of the fifth example.
Figure 17:
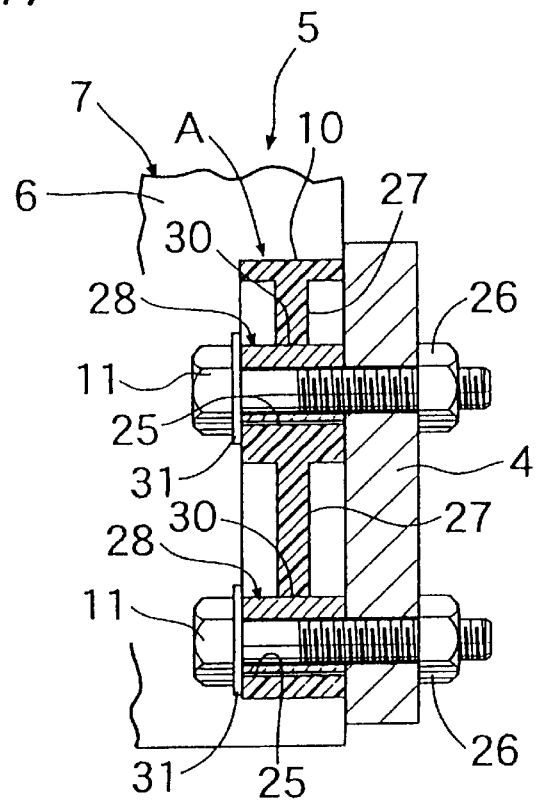
FIG. 17 shows a sectional view taken along the line 17—17 of FIG. 16.

FIGS. 4 to 6 illustrate a second example. In this case, a bracket 10 is integrally provided on left and right sides of the synthetic resin box 6, and these device side brackets 10 arc placed on both the vehicle body side brackets 4 and are then fixedly secured to the vehicle body side brackets 4 with a plurality of bolts 11.

The respective device side brackets 10 are formed of a steel sheet and each comprise an insert portion 14 partially embedded in the box 6 when it is molded and a fixedly securing portion 15 bent at substantially right angles relative to the insert portion 14 and having formed therein a plurality of bolt through holes. Front and rear edges of the insert portion 14 each have an inclined portion (b) which is formed so that a distance between the front and rear edges gradually increases downwardly from an upper edge (c) of the insert portion 14, and are embedded at both the inclined portions (b) and in the vicinity thereof and upper end portions are contiguous, respectively, with the inclined portions (b) and in the vicinity thereof in a pair of front and rear elongated projections 16 which are integral with the box 6 and extend in parallel with both the inclined portions (b).

The device side brackets 10 having two sets of left and right insert portions 14 and the pair of front and rear elongated projections 16 constitute an impact energy absorption body A, and therefore the device main body 7 is fixed to the vehicle body via the impact energy absorption body A. In this state, when an impact energy F which is larger than a predetermined value is applied to the shift lever 9 from above, the impact energy so applied breaks the impact energy absorption body A. In other words, the insert portion 14 breaks the upper end portions of the front and rear elongated projections 16, expands the elongated projections 16 in fore and aft directions and breaks them entirely, this series of actions by the insert portion 14 being arranged to happen sequentially in that order, and as shown by two-dot chain lines in FIG. 6, the device 5 is allowed to move in the impact energy applied direction. Thus, the impact energy F is absorbed.

In the second example, the insert portion 14 may be provided on the box 6 in a vertically inverted fashion, and both the front and rear elongated projections 16 may be provided on the vehicle body side brackets 4, which are formed of a synthetic resin.

FIGS. 7 to 10 illustrate a third example. In this case, device side brackets 10 are is integrally provided on the left and right sides of the synthetic resin box 6, and those device side brackets 10 are placed on the vehicle body side brackets 4, respectively, and fixedly secured to the vehicle body side brackets 4 with a plurality of bolts 11.

The respective device side brackets 10 are formed from a steel sheet and comprise an insert portion 14 partially embedded in and made integral with the box 6 when it is molded and a fixedly securing portion 15 bent at substantially right angles relative to the insert portion 14 and having formed therein a plurality of bolt through holes. The insert portion 14 is constituted by a flat plate portion 17 parallel with both the left and right sides of the box 6 and front and rear hooked portions 18 contiguous with front arid rear edges of the flat plate portion 17, respectively. The front and rear hooked portions 18 are inclined such that a distance between the front and rear hooked portions 18 gradually decreases downwardly from an upper edge thereof. A plate-like protrusion 19 integral with the left and right side walls of the box 6 is molded in a space formed by the flat-plate like portion 17 and the front and rear hooked portions 18 so as to be secured to the insert portion 14 tightly and a rivet-like small projection 20 residing on both the projections 19, respectively, is molded by a through hole 21 in the plate-like portion 17 and a mold so as to tightly be secured to the through holes 21.

The device side brackets 10 having two sets of left and right insert portions 14 and the plate-like projections 19 constitute an impact absorption body A, and therefore the device main body 7 is fixed to the vehicle body via the impact energy absorption body A. In this state, if an impact energy F which is equal to or greater than a predetermined value is applied to the shift lever 9 from above, the impact energy absorption body A is broken. In other words, since both the plate-like portions 19 expand the front and rear hooked portions 18 of in fore and aft directions, as shown by two-dot chain lines in FIG. 9, the device 5 is allowed to move in the direction in which the impact energy applied direction. Thus, the impact energy F can be absorbed.

In the third example, the insert portion 14 may be provided on the box 6 in a vertically inverted fashion, and both the right and both the projections 19 can be provided on the vehicle body side brackets 4 if the brackets 4 are molded of a synthetic resin.

FIGS. 11 to 14 illustrate a fourth example. In this case, the synthetic resin box 6 comprises an upper portion 22 having a wider transverse width, a lower portion 23 having a narrower transverse width and an intermediate portion 24 located between the upper and lower portions 22, 23 and having a transverse width which gradually decreases from an upper side toward a lower side. A device side bracket 10 is integrally provided on left and right inclined sides of the intermediate portion 24, respectively, and these device side brackets 10 are placed on the vehicle body side brackets 4, respectively, whereby the former is fixedly secured to the latter with a plurality of bolts 11.

The respective device side brackets 10 are formed from a steel sheet and comprise an insert portion 14 partially embedded in the intermediate portion 24 of the box 6 when it is molded and a fixedly securing portion 15 bent at substantially right angles relative to the left and right sides of the upper portion 22 of the insert portion 14 in the vicinity of a boundary between the upper and intermediate portions 22, 24 of the box 6 and having formed therein plurality of bolt through holes 25. The front and rear widths of the insert portion 14 is constant and front and rear edge portions and end portions on a lower edge portion thereof are integral with the box 6, and they are embedded in a pair of front and rear elongated projections 16.

The device side brackets 10 each having a set of left and right bent portions (d) constitute an impact energy absorption body A, and therefore the device main body 7 is fixedly secured to the vehicle body via the impact energy absorption body A. In this state, if an impact energy F equal to or larger than a predetermined value is applied to the shift lever 9 from above, the impact energy absorption body A is broken. In other words, the device side brackets 10 are further bent from the bent portions, and as shown by two-dot chain lines in FIG. 12, the device 5 is allowed to move in the impact energy applied direction. Thus, the impact energy F is absorbed.

FIGS. 15 to 18 illustrate a fifth example. In this case, a bracket 10 is integrally provided on left and right sides of the synthetic resin box 6, and those device side brackets 10 are overlapped on rear sides of the vehicle body side brackets 4 and are then fixedly secured to the vehicle body side brackets 4, respectively, with a plurality of bolts 11, in the illustrated example, 2 bolts 11, and nuts 26 screwed thereon, respectively.

The respective device side brackets 10 each have square bolt through holes at upper and lower portions thereof and thin portions 27 extending upwardly from upper edges of the respective bolt through holes 25. A steel collar 28 through which the bolt 11 is put is inserted into the respective bolt through holes 25. The respective collars 28 are molded into a shape having a pentagonal cross-section through a forging process so as to approach the lower side and left and right sides of the bolt through hole 25. The collar 28 has an angled surface 29 facing an upper surface of the bolt through hole 25. A ridgeline 30 of the angled surface 29 is located close to the thin portion 27, which is a weak portion 30. An end face of the respective collars 28 abuts with the vehicle body side bracket 4, and the other end face thereof abuts with a washer fitted over the bolt 11.

Figure 18:
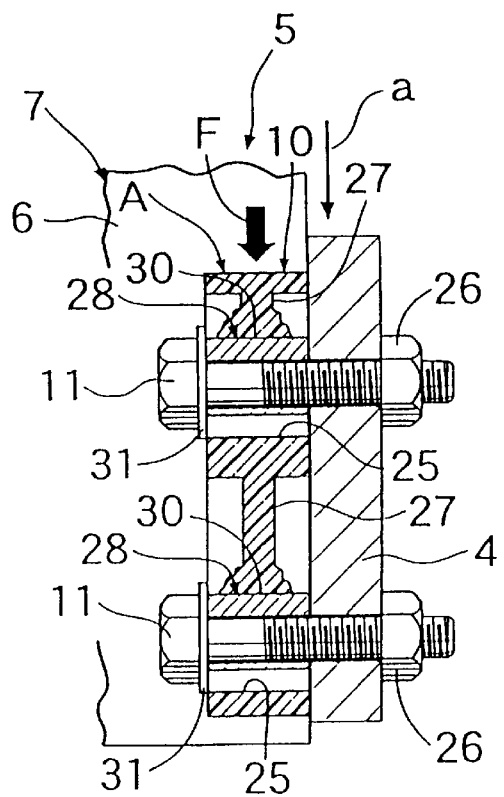
FIG. 18 shows an illustration showing an operation of the fifth example, which corresponds to FIG. 17.

The device side brackets 10 having two sets of left and right thin portions 27, bolts 11, nuts 26 and collars 28 constitute an impact energy absorption body A, and therefore the device main body 7 is fixedly secured to the vehicle body via the impact energy absorption body A. In this state, when an impact energy F equal to or larger than a predetermined value is applied to the shift lever 9 from above, the impact energy absorption body A is broken. In other words, as shown in FIG. 18, since the thin portions 27 of the respective device side brackets 10 are broken by the respective collars 28 each having an angled surface 29, the device 5 is allowed to move in the impact energy applied direction (a). Thus, the impact energy F is absorbed.

In the fifth example, the device side brackets 10 may be formed of a steel sheet, and the vehicle body side brackets 4 may be formed from a synthetic resin, whereby the thin portions of the vehicle body side brackets 4 may be broken by the collars 28.

Figure 19:
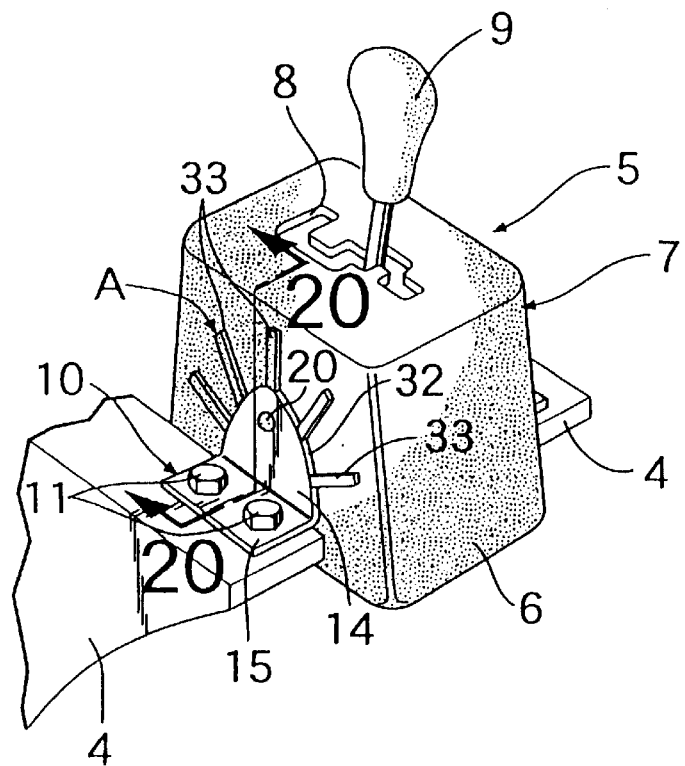
FIG. 19 shows a perspective view of a sixth example.
Figure 20:
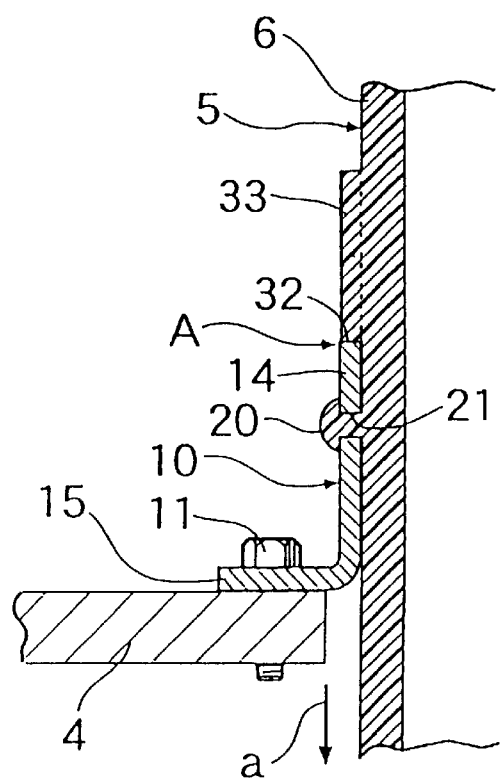
FIG. 20 shows a sectional view taken along the line 20—20 of FIG. 19.

FIGS. 19 and 20 illustrate a sixth example. In this case, the respective device side brackets 10 are formed of a steel sheet and comprise an insert portion 14 made integral with the box 6 when it is molded and a fixedly securing portion 15 bent substantially at right angles relative to the insert portion 14 and having formed therein a plurality of bolt through holes. A rivet-like small projection 20 residing on the left and right sides of the box 6 is formed by a through hole 21 in the respective insert portions 14 and a mold in such a manner as to tightly be secured to the through hole 21. The respective insert portions 14 each have an arc-like outer circumferential surface 32, and a plurality of projections 33 residing on the left and right sides of the box 6 and arranged substantially radially thereon are tightly secured to the arc-like outer circumferential surface 32 at inner end portions thereof.

The device side brackets 10 having two sets of left and right insert portions 14, through holes 21, small projections 20, the plurality of projections 33 constitute an impact energy absorption body A, and therefore the device main body 7 is fixedly secured to the vehicle body via the impact energy absorption body A. In this state, when an impact energy F equal to or larger than a predetermined value is applied to the shift lever 9 from above, the impact energy absorption body A is broken. In other words, the small projections 20 are broken, and some of the projections 33 are chipped off by the insert portion 14, and this allows the device 5 to move in the impact energy applied direction (a). Thus, the impact energy F is absorbed.

According to the aforesaid construction, all the impact energy directed toward the arc-like outer circumferential surface 32 of the insert portion 14 can be absorbed. In this sixth example, the box 6 may be provided with the insert portion 14 vertically inverted, and the respective projections 33 may be provided on the vehicle body side brackets 4 by forming the brackets from a synthetic resin.

Hereinafter, preferred embodiments according to the second aspect of the present invention will be explained.

Figure 21:
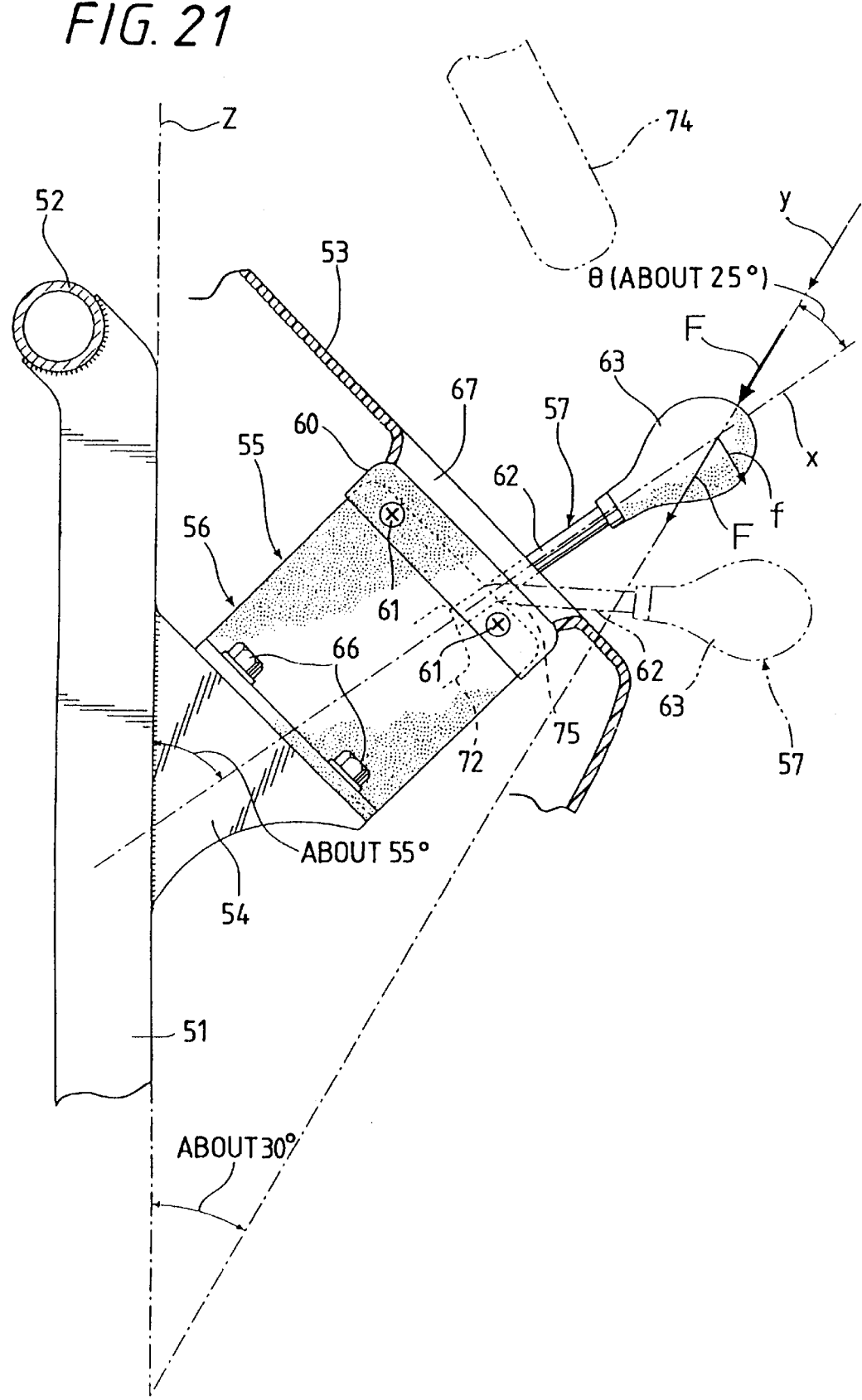
FIG. 21 shows a side view of a shifting device provided with an impact energy absorption structure.
Figure 22:
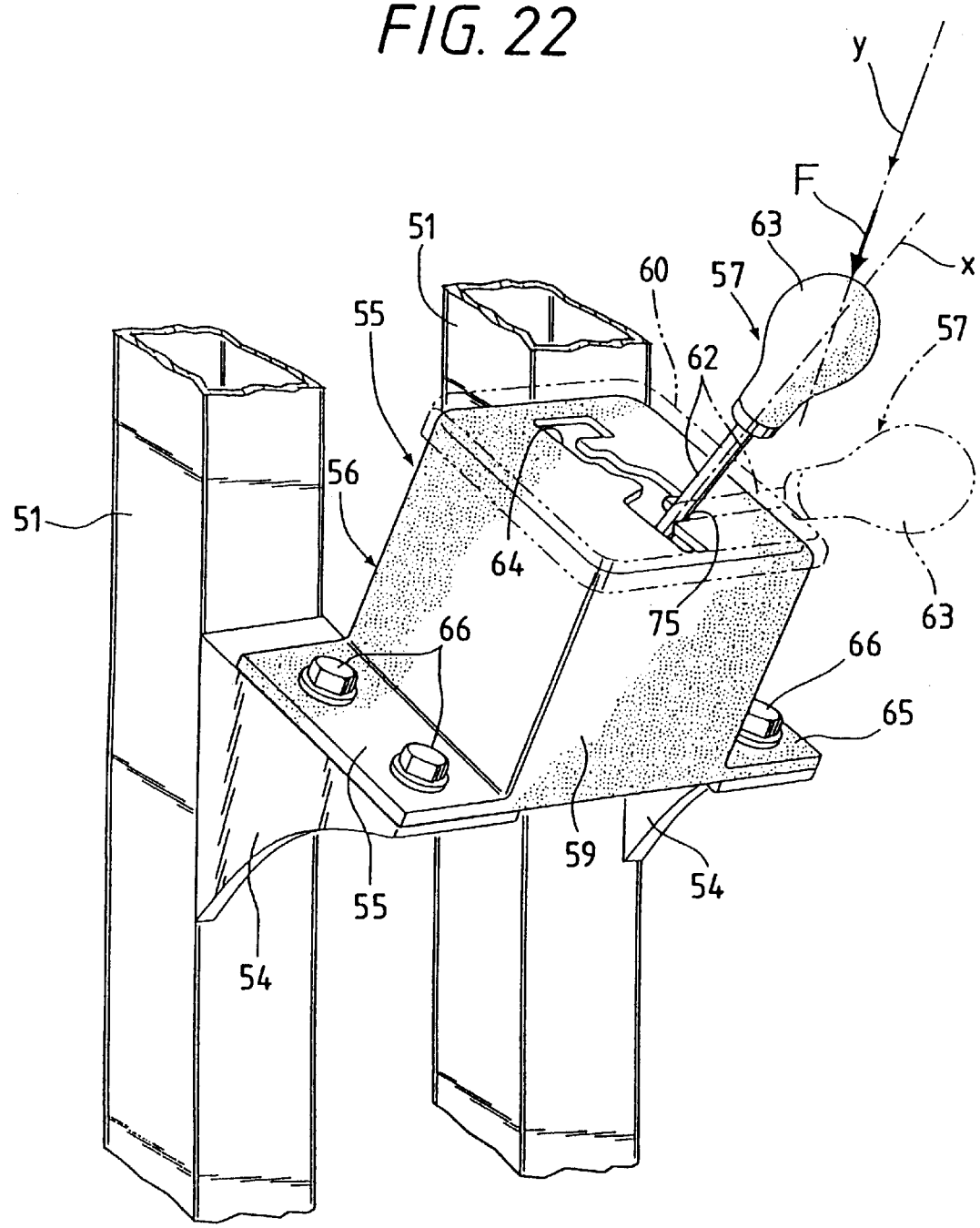
FIG. 22 shows a perspective view of the shifting device provided with the impact energy absorption structure.

In FIGS. 21 and 22, a vehicle body of a passenger car as a vehicle has a pair of left and light steel center frames 51 provided on a floor of the vehicle body in such a manner as to erect therefrom, and the respective center frames 51 are connected to each other at upper end portions thereof with a steel cross member 52. These center frames 51 and cross member 52 are concealed by an instrument panel 53.

Figure 23:
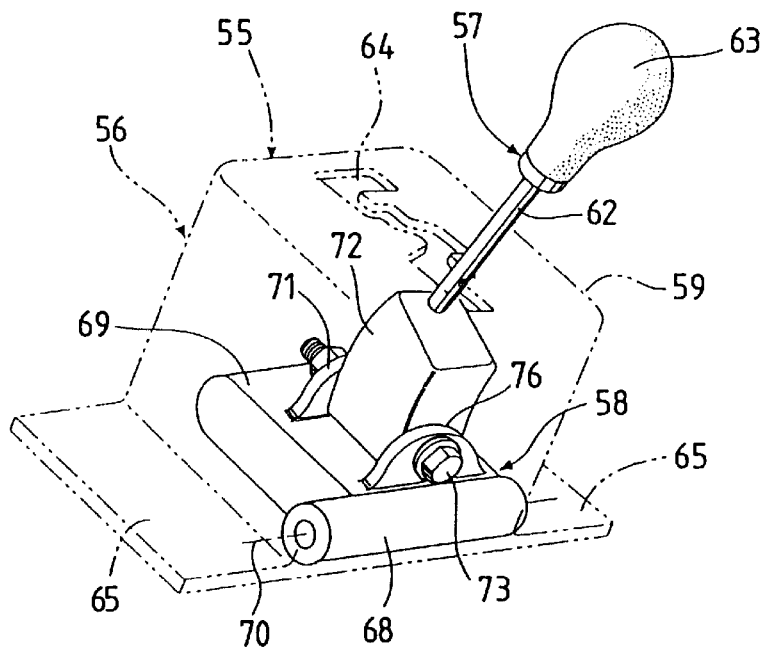
FIG. 23 shows a perspective view of an internal structure of the shift device.

Both the center frames 51 have a steel bracket 54 on a back thereof, and a shift device 55 is supported between those vehicle side brackets 54. This shift device 55 comprises a device main body 56 and a shift lever 57 protruding from the device main body 56. As shown in FIG. 23, the device main body 56 comprises a manipulating force transmission member 58 connected to the shift lever 57 and a synthetic resin box 59 accommodating therein the member 58, and a cover member 60 is placed on an upper portion of the box 59 so as to cover the same and is attached to the box 59 with a plurality of machine screws 61.

The shift lever 57 has a steel rod-like lever main body 62 and a synthetic resin manipulating knob 63. As is clearly shown in FIG. 24, a shift gate 64 is provided in an upper wall of the box 59, and a gate matching the gate 64 is also provided in the cover member 60, but the illustration thereof is omitted herein. The rod-like lever main body 62 extends through those shift gates. A bracket 65 is integrally provided on left and right sides of the box 59, respectively, and these device side brackets 65 are placed over the vehicle body side brackets 54 and are then fixedly secured thereto with a plurality of bolts 66. This positions the shift gate 64 of the box 59 in an opening 67 in the instrument panel 53, and the shift lever 57 protrudes into the passenger compartment through the opening 67.

The manipulating force transmission member 58 has a link member 69 comprising a hollow cylindrical portion 68 having an axis extending transversely, and the link member 69 is supported on the box 59 via a first support shaft 70 inserted into the hollow cylindrical portion 68 in such a manner as to freely rock in fore and aft directions. A pair of front and rear bearing members 71 are provided on an upper surface of the link member 69, a support member 72 provided at a lower edge of the rod-like lever main body 62 is supported on those bearing members 71 via a second support shaft 73 in such a manner as to freely rock in transverse directions.

In FIG. 21, a steering wheel 74 is disposed above the shift lever 57. Therefore, an impact energy F generated by the head of the driver in conjunction with a frontal collision between passenger vehicles is applied to the manipulating knob 63 of the shift lever 67 from above and diagonally the rear.

Figure 24:
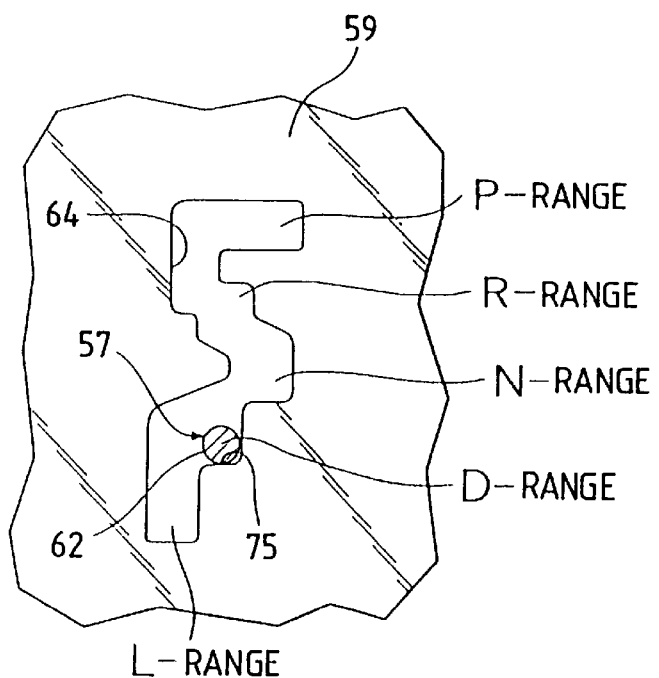
FIG. 24 shows a partially enlarged perspective view showing an upper surface of a box.

In this case, the rod-like lever main body 62 of the shift lever 57 is disposed on the device main body 56 such that its axis (a) intersects with an impact energy applied direction (b), so that a component of force (f) is generated based on the impact energy so applied in a bending direction. In a state illustrated in FIGS. 21 and 22, the shift lever 77 resides in the D-range as shown in FIG. 24, and at this time the axis (x) of the rod-like lever main body 62 is inclined rearward at an angle of 55 degrees relative to a vertical line (z), and the impact energy applied in a direction (y) is inclined at an angle of 30 degrees relative to the vertical line (z). Consequently, the intersecting angle Θ between the axis (x) and the impact energy applied in the direction (y) is about 25 degrees.

When an impact energy equal to or larger than a predetermined value is applied to the manipulating knob 63 of the shift lever 57 by the head of the driver in the aforesaid state, a component of force (f) based on the impact energy so applied is generated in the bending direction, and as shown by alternate long and short dash lines in FIGS. 21 and 22, the component of force (f) so generated bends the rod-like lever main body 62 at an edge portion 75 of the D-range in the shift gate 64 as a fulcrum in a clockwise direction. In this case, since the rod-like lever main body 62 is bend at an intermediate portion thereof, the impact energy absorption stroke becomes relatively long, providing a high impact energy absorption performance.

An impact energy absorption operation as described above also occurs while the shift lever 57 is located in an N-range and an L-range.

In addition, the rod-like lever main body 62 may be inclined forward at a predetermined angle relative to the vertical line (z). Furthermore, in order for the rod-like lever main body 62 to easily be bent by virtue of the impact energy F, as a means for attaining this end, the rod-like lever main body 62 is made thinner at a portion confronting the edge portion of the shift gate 64 than other portions thereof and a notch is formed in the portion confronting the edge portion. Moreover, the rod-like lever main body 62 may be formed of an impact energy absorbing material.

Note that the examples are separately explained in the above-mentioned description, whereas it is possible to use a plurality of embodiments with one another.

According to a first aspect of the present inventions, with the constructions described above, it is possible to provide an impact energy absorption structure for a shift device for a vehicular transmission.

In addition, according to a second aspect of the present invention, with the construction having been described heretofore, an impact energy absorption structure for a shifting device for a vehicular transmission can be provided which provides a high impact energy absorption performance.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. The impact energy absorption structure for a shifting device of a vehicular transmission, said structure comprising:
   a main body;
   a shift lever protruding from said main body;
   an impact absorption member, through which said main body is fixed to a vehicle body, adapted to be broken by an impact force more than a predetermined force applied to said shifting device, to thereby allow said shifting device to move in an impact force applied direction, wherein said impact absorption member comprises:
a side bracket fixedly secured to said vehicle body;
a projection portion mounted on said main body and engaged with said side bracket,
wherein the engagement between said side bracket and said projecting portion is separated when said impact force is applied to said shifting device.

2. The impact energy absorption structure for a shifting device of a vehicular transmission, said structure comprising:

a main body;
a shift lever protruding from said main body;
an impact absorption member, through which said main body is fixed to a vehicle body, adapted to be broken by an impact force more than a predetermined force applied to said shifting device, to thereby allow said shifting device to move in an impact force applied direction,
wherein said main body comprises a shift gate from which said shift lever protrudes, and said shift lever is provided with an elongated lever main body which is disposed on said main body in such a manner that a longitudinal axis of said elongated lever main body intersects with said impact force applied direction.

3. The impact energy absorption structure according to claim 2, wherein said elongated lever main body is bent by an edge portion of said shift gate when said shift lever is subject to the impact force.

4. The impact energy absorption structure for a shifting device of a vehicular transmission, said structure comprising:

a main body;
a shift lever protruding from said main body;
an impact absorption member, through which said main body is fixed to a vehicle body, adapted to be broken by an impact force more than a predetermined force applied to said shifting device, to thereby allow said shifting device to move in an impact force applied direction,
wherein said impact absorption member comprises a side bracket integrally formed with said main body and fixed to said vehicle body, and said side bracket has a notched groove for shearing said side bracket when said impact force is applied to said shifting device,
wherein said side bracket extends perpendicularly from said main body, and said notched groove is provided at a portion joining said side bracket and said main body, so that said main body separates from said side bracket at said notched grooved when said impact force is applied to said shifting device.

5. The impact energy absorption structure for a shifting device of a vehicular transmission, said structure comprising:

a main body;
a shift lever protruding from said main body;
an impact absorption member, through which said main body is fixed to a vehicle body, adapted to be broken by an impact force more than a predetermined force applied to said shifting device, to thereby allow said shifting device to move in an impact force applied direction,
wherein said impact absorption member comprises a side bracket integrally formed with said main body and fixed to said vehicle body, and said side bracket has a notched groove for shearing said side bracket when said impact force is applied to said shifting device,
wherein said side bracket has an insert portion which is flush with said main body and a securing portion which is secured to a vehicle body side bracket, said main body has a pair of elongated projections, said insert portion is secured to said main body by said pair of elongated projections, and said insert portion breaks said pair of elongated projections when said impact force is applied to said shifting device so that said main body separates from said side bracket.

6. The impact energy absorption structure for a shifting device of a vehicular transmission, said structure comprising:

a main body;
a shift lever protruding from said main body;
an impact absorption member, through which said main body is fixed to a vehicle body, adapted to be broken by an impact force more than a predetermined force applied to said shifting device, to thereby allow said shifting device to move in an impact force applied direction,
wherein said impact absorption member comprises a side bracket integrally formed with said main body and fixed to said vehicle body, and said side bracket has a notched groove for shearing said side bracket when said impact force is applied to said shifting device,
wherein said side bracket has an insert portion and a securing portion which is secured to a vehicle body side bracket, said insert portion has a flat plate portion parallel with the left and right sides of the main body, and hooked portions contiguous with front and rear edges of said flat plate portion, said main body has a protrusion so that said hooked portions are engaged with said protrusion, sand wherein said hooked portions separate from said side bracket when said impact force is applied to said shifting device so that said main body separates from said side bracket.

7. An impact energy absorption structure for a shifting device of a vehicular transmission, said structure comprising:

a main body;
a shift lever protruding from said main body;
an impact absorption member, through which said main body is fixed to a vehicle body, adapted to be broken by an impact force more than a predetermined force applied to said shifting device, to thereby allow said shifting device to move in an impact force applied direction; and
supporting portions on said main body, which are disposed at both ends of said main body and are respectively fixed to a pair of columns of the vehicle body, in such a manner that when said main body is subject to the impact force said main body drops down and is received in an impact absorption chamber,
wherein said impact absorption chamber is located below the main body in an axial direction of said shift lever, and
said impact absorption member separates said main body from said supporting portions and drops said main body down when said main body is subject to the impact force.

8. The impact energy absorption structure according to claim 7, wherein said impact absorption member comprises a side bracket integrally formed with said main body and fixed to said vehicle body, and said side bracket has a notched groove for shearing said side bracket when said impact force is applied to said shifting device.

9. The impact energy absorption structure according to claim 7, wherein said impact absorption member comprises:

a side bracket fixedly secured to said vehicle body;

a projection portion mounted on said main body and engaged with said side bracket, wherein the engagement between said side bracket and said projecting portion is separated when said impact force is applied to said shifting device.

10. The impact energy absorption structure according to claim 7, wherein said main body comprises a shift gate from which said shift lever protrudes, and said shift lever is provided with an elongated lever main body which is disposed on said main body in such a manner that a longitudinal axis of said elongated lever main body intersects with said impact force applied direction.

11. The impact energy absorption structure according to claim 10, wherein said elongated lever main body is bent by an edge portion of said shift gate when said shift lever is subject to the impact force.

* * * * *